A. R. DARLING.
TOOTH NERVE TESTER.
APPLICATION FILED MAR. 21, 1917.
1,242,778.
Patented Oct. 9, 1917.
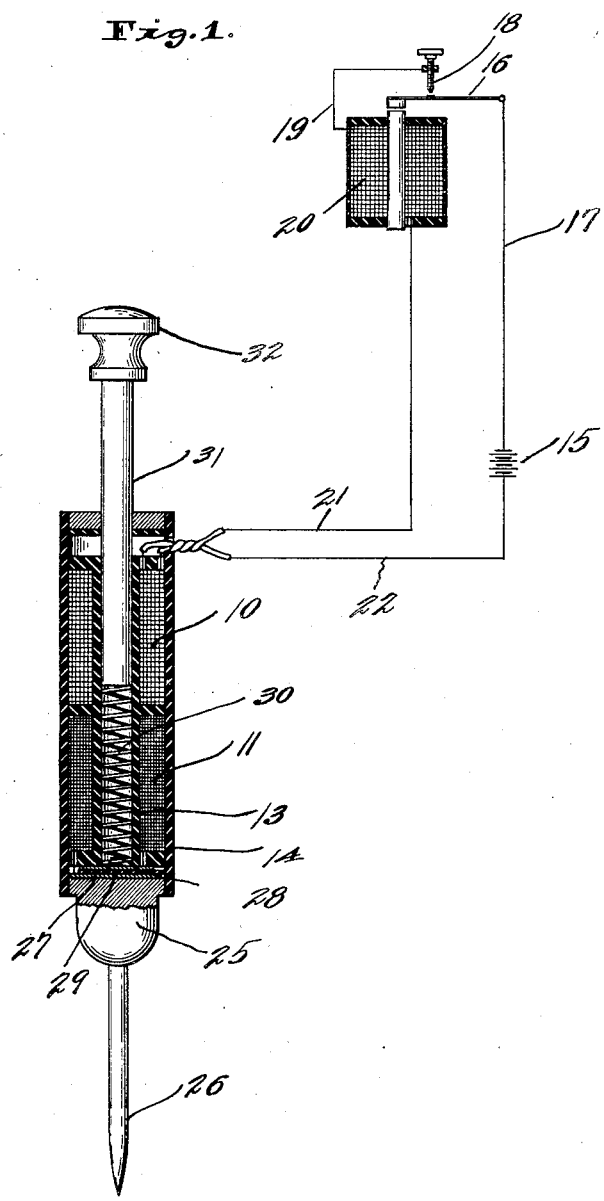
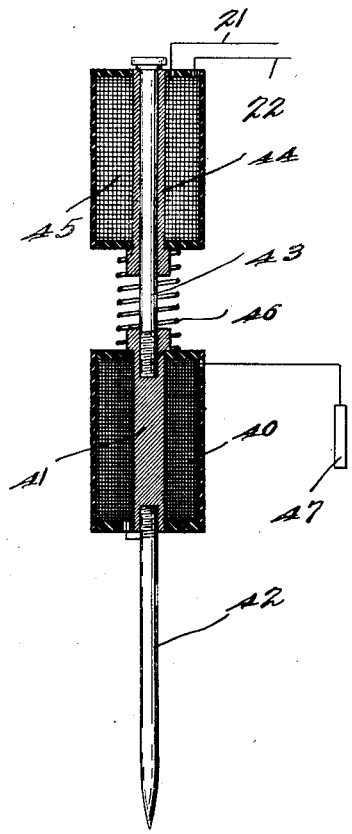
Witness
Frank A. Sable
Inventor
Arthur R. Darling,

UNITED STATES PATENT OFFICE.

ARTHUR R. DARLING, OF INDIANAPOLIS, INDIANA, ASSIGNOR TO EDWARDS INSTRUMENT COMPANY, OF INDIANAPOLIS, INDIANA, A CORPORATION OF INDIANA.

TOOTH-NERVE TESTER.

1,242,778.  Specification of Letters Patent.  Patented Oct. 9, 1917.

Application filed March 21, 1917. Serial No. 158,515.

*To all whom it may concern:*

Be it known that I, ARTHUR R. DARLING, a citizen of the United States, residing at Indianapolis, in the county of Marion and State of Indiana, have invented a new and useful Tooth-Nerve Tester, of which the following is a specification.

It frequently happens that the nerve of a tooth dies, even when the tooth is apparently sound, without giving any external indication. This almost universally results in an abscess in the bone structure at the end of the root of the tooth, which abscess may not give any local pain or external indication of its presence and may exist unknown for years. During this time the pus continuously formed in the abscess is absorbed into the system and may cause various ailments, such as rheumatism, heart disease, kidney disease, etc., all really due to the pus caused by this dead tooth nerve but often attributed to other causes. The dentist may have examined the tooth many times during this period, and found nothing wrong, because of the absence of any external signs.

It is the object of my present invention to provide a tooth-testing instrument, by which the dentist may determine absolutely whether or not the nerve of a tooth is vital.

In doing this, I provide an instrument with a probe of conducting material of suitable form to engage the tooth, and this probe has associated with it an induction coil with a variable-reluctance magnetic circuit interconnecting the primary and secondary coils, preferably including a spring-pressed member which is movable against its spring to decrease such reluctance and thereby increase the voltage of the secondary winding of such induction coil, the secondary of this induction coil having one terminal connected to such probe and the other provided with any suitable connection whereby the secondary circuit through the tooth may be completed. Preferably the make and break device for this induction coil is separate from the instrument, to avoid vibration in the instrument.

The accompanying drawing illustrates my invention. Figure 1 is a sectional view through one form of tooth tester embodying my invention, showing the connections of the make and break device somewhat diagrammatically; and Fig. 2 is a similar section through a modified form of tooth tester embodying my invention.

In the arrangement shown in Fig. 1, the tooth-testing instrument comprises a primary coil 10 and a secondary coil 11 wound on any suitable non-magnetic spool 13, and provided with a tubular cover 14 covering both coils. The coils 10 and 11 are shown as arranged end to end, and are relatively fixed. The primary coil 10 is supplied from any suitable source of alternating or pulsating current, as from a battery 15 and magnetic vibrator 16, one terminal of the battery 15 being shown connected by a wire 17 to such vibrator the adjustable contact 18 of which is connected by a wire 19 to one terminal of the magnet 20 of the vibrator, the other terminal of such magnet 20 and the other side of the battery 15 being connected by wires 21 and 22 respectively to the two terminals of the primary coil 10. Mounted in the lower end of the casing 14 is a metal piece 25 which is provided with a probe 26 of metal or other conducting material for engaging the tooth to be tested, in which the possibly dead nerve is located. One end of the secondary coil 11 is connected to this metal piece 25 and therethrough to the probe 26, conveniently by being soldered to a sheet metal plate 27 against which the metal piece 25 bears. The other terminal of the secondary coil 11 is connected to a similar metal plate 28, separated from the plate 27 by a disk of insulation 29. The metal disk 28 forms an abutment for a compression spring 30 located within the non-magnetic spool 13, which spring by its tendency to expand tends to push upward an iron bar 31 slidably mounted in such non-magnetic spool 13. This bar 31 conveniently has a thumb piece 32 at its upper end. By pushing the bar 31 into the non-magnetic spool 13 the reluctance of the magnetic circuit interconnecting the primary and secondary coils 10 and 11 is lessened, thereby increasing the voltage of the secondary coil 11.

The dentist who is testing the tooth does this by grasping the casing 14 in his hand so that his thumb engages the thumb piece 32, so that by pushing on such thumb piece he pushes the rod 31 into the spool 13 and thereby raises the voltage of the secondary coil. The dentist completes the secondary circuit by placing the probe 26 against the tooth to be tested and touching the patient at any convenient point, as by laying his hand against the patient's cheek, for through his thumb the dentist is connected to one terminal of the secondary coil 11, and through the probe 26 the possibly dead nerve in the patient's tooth is connected to the other side of such secondary coil. If the nerve is dead, the dentist can push the rod 31 entirely into the spool 13, and the patient will feel nothing in the tooth being tested. If the nerve is vital, the patient feels the current in the tooth before the rod 31 has been pushed in very far. A whole set of teeth may be tested in a few minutes, and any dead nerve located positively and accurately so that proper treatment may be given for the abscesses probably associated therewith.

In the arrangement shown in Fig. 2, the primary and secondary coils are relatively movable, instead of being relatively fixed and having a movable core as in the arrangement shown in Fig. 1. The secondary coil 49 is wound on a relatively fixed iron core 41, which at one end has fixed therein the probe 42. In the other end of the core 41 of the secondary coil is fixed a non-magnetic rod 43 on which is slidably mounted the tubular core 44 of the primary core 45, which is carried by the tubular core 44 and fixed relatively thereto. The primary coil 41 is connected to the same wires 41 and 42 as is the primary coil 10 in the arrangement shown in Fig. 1. A spring 46 located between the two coils tends to force them and their cores apart by sliding the core 44 and its primary core 45 upward on the rod 43. Preferably, the adjacent ends of the cores 41 and 44 are extended somewhat toward each other beyond their associated coils, so as to allow them to come closer together than they otherwise could, while still allowing space for the spring 46. One terminal of the secondary coil 40 is connected to the probe 42, and the other may be connected to an electrode 47, which may be held by the patient while his tooth is being tested.

In using this form of tooth tester, the patient holding the electrode 47, the dentist puts the probe on the tooth containing the nerve to be tested, and, grasping the coil 45, pushes it and its core 44 downward along the rod 43 to bring the cores 44 and 41 closer together, thus decreasing the reluctance of the magnetic circuit of the induction coil, and thereby raising the voltage of the secondary coil 40, with results as in the use of the instrument shown in Fig. 1.

I claim as my invention:

1. A tooth nerve testing instrument, comprising a probe for engaging the tooth, an induction coil having one terminal of its secondary winding connected to said probe, and means for varying the secondary voltage of said induction coil.

2. A tooth nerve testing instrument, comprising a probe for engaging the tooth, and an induction coil mounted on said probe so as to be held by the hand of the dentist and having one terminal of its secondary winding connected to said probe, said induction coil including a member which is movable to vary the secondary voltage of such induction coil, and means tending to move said movable member to reduce such secondary voltage.

3. A tooth nerve testing instrument, comprising a probe for engaging the tooth, and an induction coil mounted on said probe so as to be held by the hand of the dentist and having one terminal of its secondary winding connected to said probe, said induction coil including a member which is movable to vary the secondary voltage of such induction coil.

4. A tooth nerve testing instrument, comprising a probe for engaging the tooth, and an induction coil mounted on said probe so as to be held by the hand of the dentist and having one terminal of its secondary winding connected to said probe, said induction coil including a member which is movable to vary the reluctance of the magnetic circuit interconnecting the primary and secondary windings of such induction coil, and means tending to move said movable member to increase such reluctance.

5. A tooth nerve testing instrument, comprising a probe for engaging the tooth, and an induction coil mounted on said probe so as to be held by the hand of the dentist and having one terminal of its secondary winding connected to said probe, said induction coil including a member which is movable to vary the reluctance of the magnetic circuit interconnecting the primary and secondary windings of such induction coil.

6. A tooth nerve testing instrument, comprising a probe for engaging the tooth, and an induction coil mounted on said probe so as to be held by the hand of the dentist and having one terminal of its secondary winding connected to said probe, said induction coil including a member which is movable to vary the secondary voltage of such induction coil, and said movable member being connected to the other terminal of the secondary winding of said induction coil, so that the secondary circuit is completed through said member, the hand of the dentist, the tooth of the patient, and said probe.

7. A tooth nerve testing instrument, comprising a probe for engaging the tooth, and an induction coil mounted on said probe so as to be held by the hand of the dentist and having one terminal of its secondary winding connected to said probe, said induction coil including a member which is movable to vary the reluctance of the magnetic circuit interconnecting the primary and secondary windings of such induction coil, and said movable member being connected to the other terminal of the secondary winding of said induction coil, so that the secondary circuit is completed through said member, the hand of the dentist, the tooth of the patient, and said probe.

8. A tooth nerve testing instrument, comprising a probe for engaging the tooth, and an induction coil mounted on said probe so as to be held by the hand of the dentist and having one terminal of its secondary winding connected to said probe, said induction coil having relatively fixed primary and secondary windings and a core movable by the dentists's thumb axially thereof to vary the secondary voltage.

9. A tooth nerve testing instrument, comprising a probe for engaging the tooth, and an induction coil mounted on said probe so as to be held by the hand of the dentist and having one terminal of its secondary winding connected to said probe, said induction coil having relatively fixed primary and secondary windings and a core movable by the dentist's thumb axially thereof to vary the secondary voltage, said core being spring-pressed in the direction to reduce said secondary voltage.

10. A tooth nerve testing instrument, comprising a probe for engaging the tooth, and an induction coil mounted on said probe so as to be held by the hand of the dentist and having one terminal of its secondary winding connected to said probe, said induction coil having relatively fixed primary and secondary windings and a core movable by the dentist's thumb axially thereof to vary the secondary voltage, said core being spring-pressed in the direction to reduce said secondary voltage and being connected to the other terminal of the secondary winding of said induction coil, so that the secondary circuit is completed through said core, the dentist's hand, the patient's tooth, and said probe.

11. A tooth nerve testing instrument, comprising a probe for engaging the tooth, and an induction coil mounted on said probe so as to be held by the hand of the dentist and having one terminal of its secondary winding connected to said probe, said induction coil having relatively fixed primary and secondary windings and a core movable by the dentist's thumb axially thereof to vary the secondary voltage, said core being connected to the other terminal of the secondary winding of said induction coil, so that the secondary circuit is completed through said core, the dentist's hand, the patient's tooth, and said probe.

12. A tooth nerve testing instrument, comprising a probe for engaging the tooth, a handle adapted to be held by the hand of the dentist and on which said probe is mounted, means whereby said probe may be subjected to an electric potential, and a member mounted on said handle and movable relatively thereto to vary said electric potential.

13. A tooth nerve testing instrument, comprising a probe for engaging the tooth, a handle adapted to be held by the hand of the dentist and on which said probe is mounted, means whereby said probe may be subjected to an electric potential, and a member mounted on said handle and movable longitudinally thereof by the dentist's thumb to vary said electric potential.

In witness whereof I have hereunto set my hand at Indianapolis, Indiana, this 19th day of March, A. D. one thousand nine hundred and seventeen.

ARTHUR R. DARLING.